United States Patent
Weber et al.

(10) Patent No.: US 8,172,488 B2
(45) Date of Patent: May 8, 2012

(54) DRILL GUIDE ASSEMBLY FOR A PNEUMATIC TIRE

(75) Inventors: Michael Joseph Weber, Sun Prairie, WI (US); James Ennis Smithkey, Canton, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 824 days.

(21) Appl. No.: 12/328,188

(22) Filed: Dec. 4, 2008

(65) Prior Publication Data

US 2010/0143060 A1 Jun. 10, 2010

(51) Int. Cl.
*B23B 45/14* (2006.01)

(52) U.S. Cl. ........................................ 408/110; 408/104
(58) Field of Classification Search .................. 408/110, 408/112, 111, 104, 105, 107, 108, 113, 114, 408/115 R, 72 R, 95, 712
See application file for complete search history.

(56) References Cited

U.S. PATENT DOCUMENTS

| | | | | |
|---|---|---|---|---|
| 769,200 A * | 9/1904 | Uschold | ......................... | 408/112 |
| 1,621,061 A * | 3/1927 | Carter | ........................... | 144/70 |
| 2,997,900 A * | 8/1961 | Pugsley | ......................... | 408/95 |
| 3,583,823 A * | 6/1971 | Eaton et al. | ............... | 408/115 R |
| 3,874,810 A * | 4/1975 | Russell | ........................... | 408/14 |
| 3,897,272 A | 7/1975 | Medlar | ........................... | 136/230 |
| 4,082,474 A * | 4/1978 | Stiger | ........................... | 408/110 |
| 4,281,694 A * | 8/1981 | Gorman | .................... | 144/154.5 |
| 4,572,715 A * | 2/1986 | Wolff | ........................... | 409/180 |
| 4,734,232 A | 3/1988 | Hoesman | ...................... | 264/46.6 |
| 4,978,257 A * | 12/1990 | Nowman | ....................... | 408/111 |
| 5,012,566 A | 5/1991 | Getz, Jr. | .......................... | 29/265 |
| 5,062,747 A * | 11/1991 | Chen | .......................... | 408/115 R |
| 5,301,977 A | 4/1994 | Schlosser et al. | ............. | 280/661 |
| 5,625,967 A | 5/1997 | Kulle | ............................... | 37/443 |
| 5,967,708 A | 10/1999 | Adams et al. | ................. | 408/115 |
| 5,979,908 A * | 11/1999 | Jones | ............................. | 277/604 |
| 6,435,781 B1 | 8/2002 | Jones | ................................ | 408/1 |
| 7,021,164 B2 | 4/2006 | Fenkanyn | ..................... | 73/866.5 |
| 2005/0265799 A1 * | 12/2005 | Hartsfield | ..................... | 408/110 |

* cited by examiner

*Primary Examiner* — Daniel Howell
*Assistant Examiner* — Paul M Janeski
(74) *Attorney, Agent, or Firm* — Robert N. Lipcsik (57) ABSTRACT

A drill guide assembly in accordance with the present invention provide a bore in a tire. The drill guide assembly includes a first slide rail for lying on the tire when the tire lies on a side and a second slide rail for lying on the tire when the tire lies on a side. The second slide rail is disposed parallel to the first slide rail. A first engagement block is slidingly secured to the first slide rail and the second slide rail. The first engagement block engages a first shoulder portion of a tread portion of the tire. A second engagement block is slidingly secured to the first slide rail and the second slide rail. The second engagement block engages a second shoulder portion of the tread portion of the tire. The second shoulder portion is diametrically opposed to the first shoulder portion. A drill mount positions a drill relative to the tire. The drill mount includes a toroidal base, a first upright guide member secured to the toroidal base, a second upright guide member secured to the toroidal base, and a slide member for slidingly engaging the first and second guide members. The slide member has two outer cylindrical tubes for sliding along the first and second guide members and a central cylindrical tube for slidingly engaging a drill.

9 Claims, 8 Drawing Sheets

DRILL GUIDE ASSEMBLY FOR A PNEUMATIC TIRE

FIELD OF THE INVENTION

The present invention relates generally to a tool for positioning a sensor within an elongate bore and, more specifically, to a tool and method for inserting a sensor or other electronic measuring device to a predetermined depth within an elongate bore in a tire.

BACKGROUND OF THE INVENTION

It is desirable to monitor physical properties of a tire during test procedures and/or operating conditions in order to ascertain and measure certain tire performance characteristics, such as temperature. Certain test procedures involve taking temperature measurements of a tire by imbedding a temperature sensor or thermocouple in the sidewall of a tire. To conduct such tests, a bore is drilled into the sidewall of the tire and the sensor or thermocouple is inserted into the bore. It is, however, very difficult to insert a sensor, thermocouple, or other relatively fragile electronic device into rubber due to inherent properties of rubber that complicate such an insertion. Contact between the rubber tire and a device inserted therein may result in damage to the device or impede the progress of the device into the tire bore to an extent that prohibits the device from reaching its optimum depth. Moreover, it is difficult to determine when the device has reached its intended depth. Continued application of insertion force against the sensor after it reaches the terminal end of the bore may result in sensor damage and consequent malfunction. Further, continued application of insertion force against a sensor misaligned with the bore after it reaches the terminal end of the bore may also damage the sensor.

Accordingly, a tool that facilitates the insertion and aligning of a sensor or thermocouple into a bore in a sidewall of a tire would be desirable.

SUMMARY OF THE INVENTION

A drill guide assembly in accordance with the present invention provide a bore in a tire. The drill guide assembly includes a first slide rail for lying on the tire when the tire lies on a side and a second slide rail for lying on the tire when the tire lies on a side. The second slide rail is disposed parallel to the first slide rail. A first engagement block is slidingly secured to the first slide rail and the second slide rail. The first engagement block engages a first shoulder portion of a tread portion of the tire. A second engagement block is slidingly secured to the first slide rail and the second slide rail. The second engagement block engages a second shoulder portion of the tread portion of the tire. The second shoulder portion is diametrically opposed to the first shoulder portion. A drill mount positions a drill relative to the tire. The drill mount includes a toroidal base, a first upright guide member secured to the toroidal base, a second upright guide member secured to the toroidal base, and a slide member for slidingly engaging the first and second guide members. The slide member has two outer cylindrical tubes for sliding along the first and second guide members and a central cylindrical tube for slidingly engaging a drill.

In accordance with another aspect of the present invention, the two outer cylindrical tubes of the slide member further include set screws for selectively securing the slide members against sliding relative to the first and second guide members.

In accordance with still another aspect of the present invention, the slide member of the drill mount is slidingly secured to the slide rails by bolts and corresponding threaded slide caps.

In accordance with yet another aspect of the present invention, the bolts and corresponding slide caps are threadingly secured in a tightly fitted arrangement such that the slide member of the drill mount is fixed against movement relative to the slide rails.

In accordance with still another aspect of the present invention, the bolts and corresponding slide caps may be loosened such that the slide member may is movable along the slide rails to a desired position and the bolts and corresponding slide caps subsequently may be tightened in that desired position relative to the slide rails.

In accordance with yet another aspect of the present invention, the engagement blocks have angled portions for abutting the first and second shoulder portions of the tire.

In accordance with still another aspect of the present invention, the engagement blocks are slidingly secured to the slide rails by bolts and corresponding threaded slide caps.

In accordance with yet another aspect of the present invention, the bolts and slide caps are threadingly secured in a tightly fitted arrangement such that the engagement blocks are thereby fixed against movement relative to the slide rails.

In accordance with still another aspect of the present invention, when the bolts and slide caps are loosened, the engagement blocks may move along the slide rails for adjusting to varied tire sizes.

In accordance with yet another aspect of the present invention, the drill guide assembly provides a retracted position for the drill and an extended position for the drill, the extended position having a predetermined limit in order to provide uniformity for a depth of the bore.

Definitions

"Aspect Ratio" means the ratio of a tire's section height to its section width.

"Axial" and "axially" mean the lines or directions that are parallel to the axis of rotation of the tire.

"Bead" or "Bead Core" means generally that part of the tire comprising an annular tensile member, the radially inner beads are associated with holding the tire to the rim being wrapped by ply cords and shaped, with or without other reinforcement elements such as flippers, chippers, apexes or fillers, toe guards and chaffers.

"Belt Structure" or "Reinforcing Belts" means at least two annular layers or plies of parallel cords, woven or unwoven, underlying the tread, unanchored to the bead, and having both left and right cord angles in the range from 17° to 27° with respect to the equatorial plane of the tire.

"Circumferential" means lines or directions extending along the perimeter of the surface of the annular tread perpendicular to the axial direction.

"Carcass" means the tire structure apart from the belt structure, tread, undertread, over the plies, but including beads, if used, on any alternative rim attachment.

"Casing" means the carcass, belt structure, beads, sidewalls and all other components of the tire excepting the tread and undertread.

"Chaffers" refers to narrow strips of material placed around the outside of the bead to protect cord plies from the rim, distribute flexing above the rim.

"Cord" means one of the reinforcement strands of which the plies in the tire are comprised.

"Equatorial Plane (EP)" means the plane perpendicular to the tire's axis of rotation and passing through the center of its tread.

"Footprint" means the contact patch or area of contact of the tire tread with a flat surface at zero speed and under normal load and pressure.

"Innerliner" means the layer or layers of elastomer or other material that form the inside surface of a tubeless tire and that contain the inflating fluid within the tire.

"Normal Inflation Pressure" means the specific design inflation pressure and load assigned by the appropriate standards organization for the service condition for the tire.

"Normal Load" means the specific design inflation pressure and load assigned by the appropriate standards organization for the service condition for the tire.

"Placement" means positioning a cord on a surface by means of applying pressure to adhere the cord at the location of placement along the desired ply path.

"Ply" means a layer of rubber-coated parallel cords.

"Radial" and "radially" mean directed toward or away from the axis of rotation of the tire.

"Radial Ply Tire" means a belted or circumferentially restricted pneumatic tire in which at least one ply has cords which extend from bead to bead and are laid at cord angles between 65° and 90° with respect to the equatorial plane of the tire.

"Section Height" means the radial distance from the nominal rim diameter to the outer diameter of the tire at its equatorial plane.

"Section Width" means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Shoulder" means the upper portion of sidewall just below the tread edge.

"Sidewall" means that portion of a tire between the tread and the bead.

"Tread Width" means the arc length of the tread surface in the axial direction, that is, in a plane parallel to the axis of rotation of the tire.

"Winding" means a wrapping of a cord under tension onto a convex surface along a linear path.

BRIEF DESCRIPTION OF THE DRAWINGS

The invention will be described by way of example and with reference to the accompanying drawings in which.

DETAILED DESCRIPTION OF THE INVENTION

Figure 1:
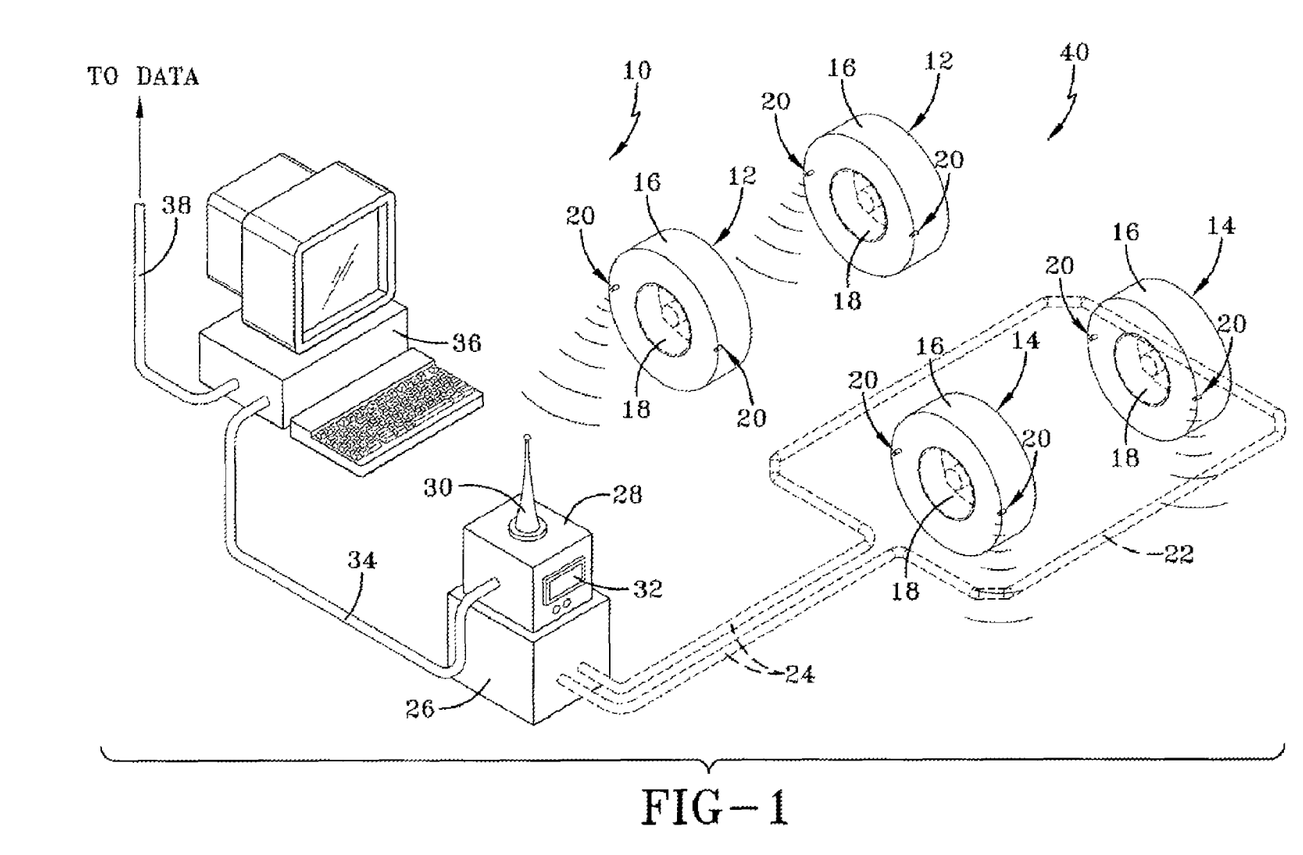
FIG. 1 is a schematic diagram of a monitoring system for use with the present invention.
Figure 2:
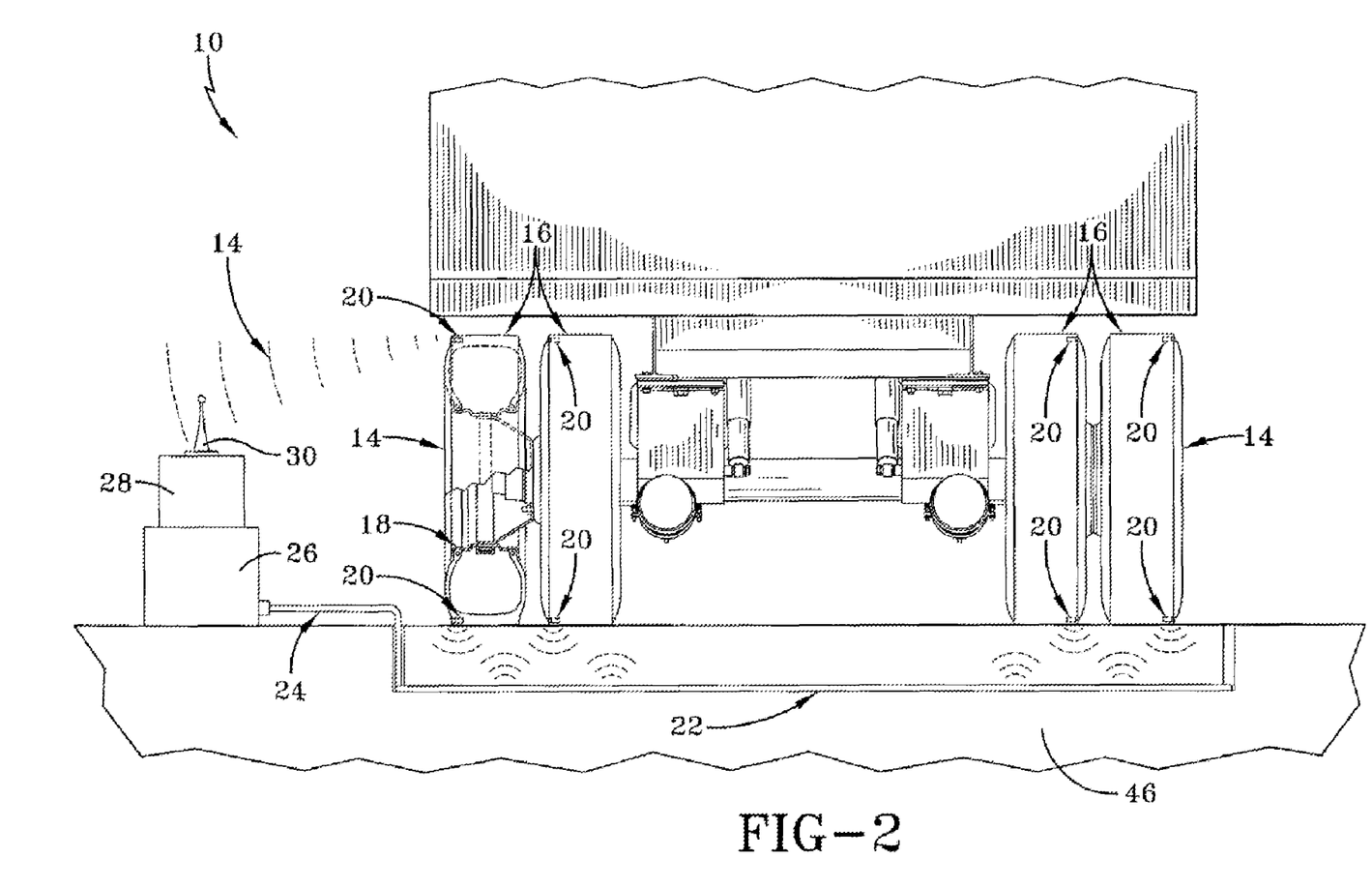
FIG. 2 is a schematic rear elevation view of a coupled tractor-trailer utilizing the monitoring system of FIG. 1.
Figure 3:
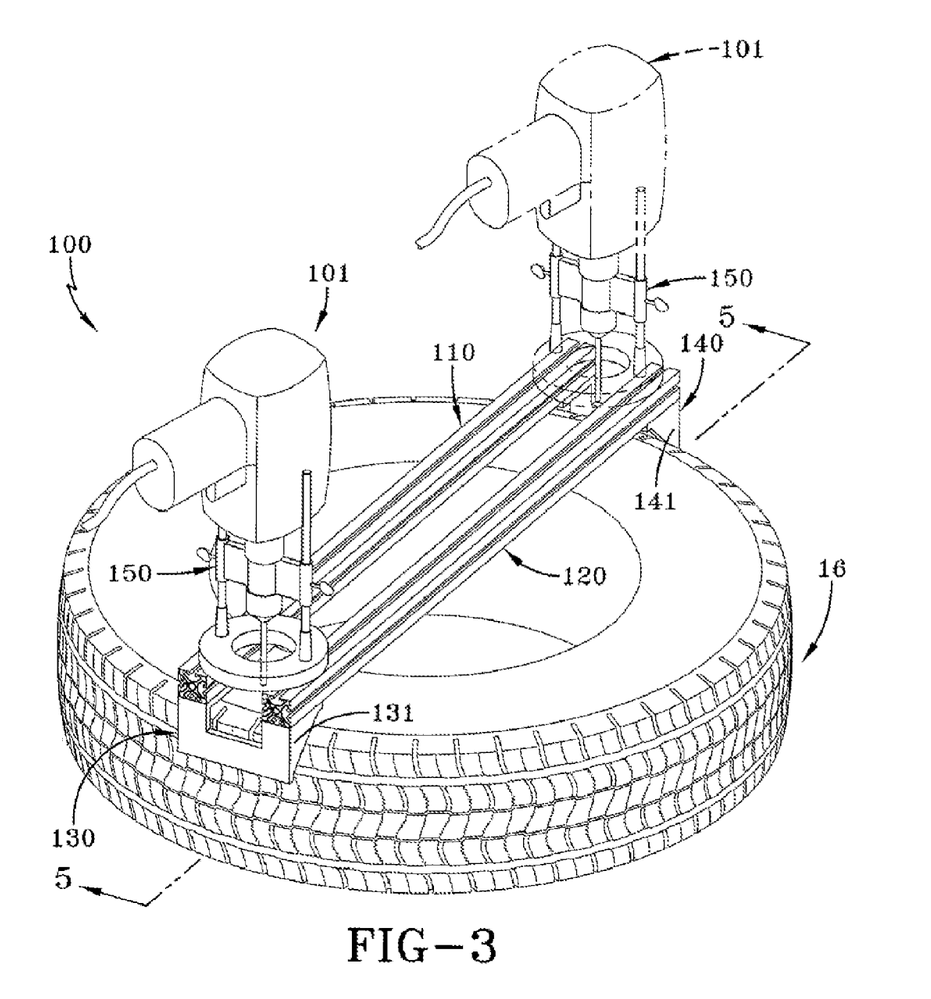
FIG. 3 is a schematic perspective view of an assembly in accordance with the present invention.
Figure 4:
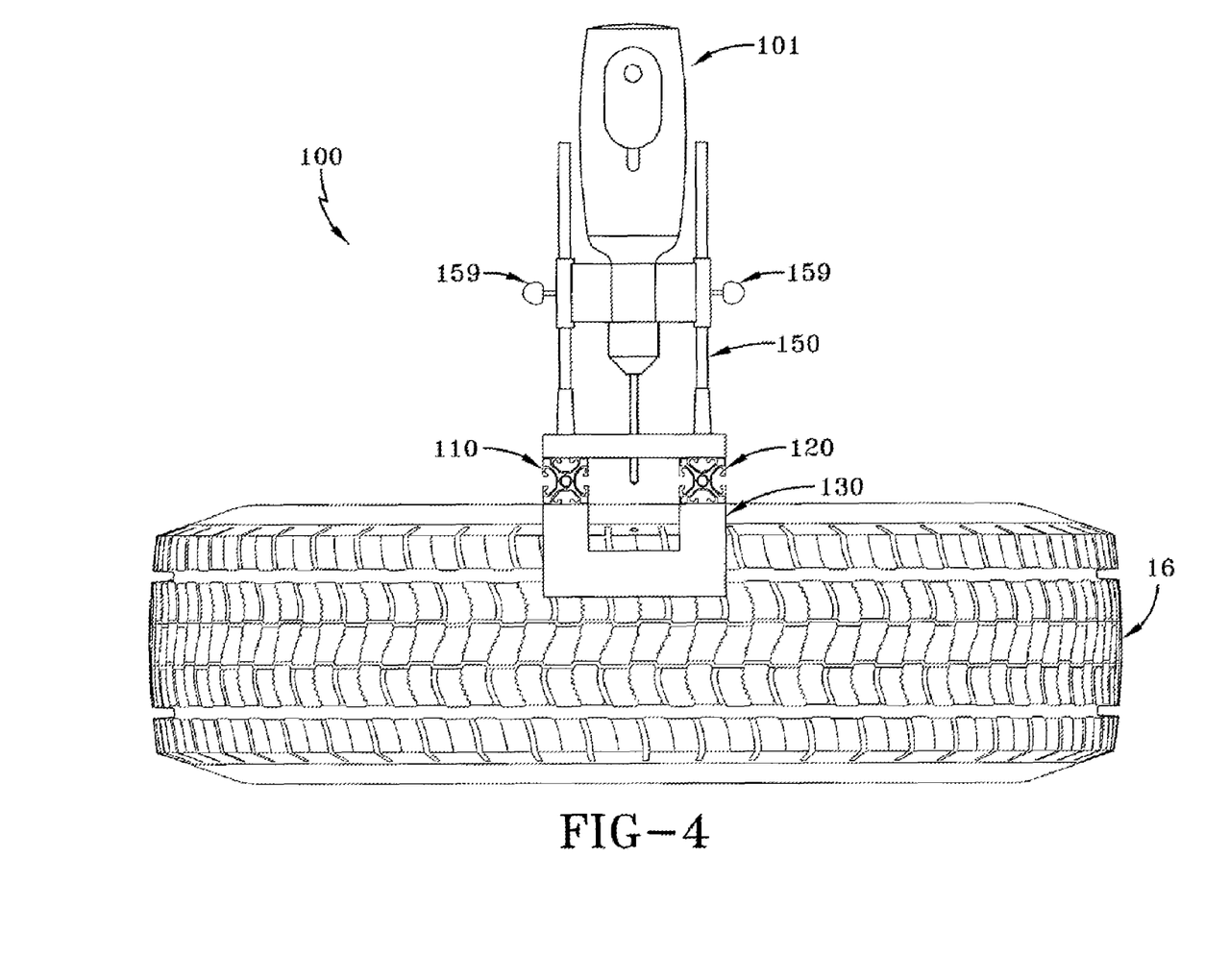
FIG. 4 is a schematic end view of the assembly of FIG. 3.

Referring initially to FIGS. 1 and 2, a monitoring system 10 is shown schematically for monitoring one or more parameters from forward and rearward pairs of wheel units 12, 14. While four wheel units are represented, more or fewer monitored wheel units may be employed. Each wheel unit 12, 14 includes a tire 16 mounted to a wheel rim 18 and one or more monitoring devices 20, such as a thermocouple, located within each tire. The monitoring system 10 may, for example, monitor wheel units in a coupled tractor-trailer. However, the monitoring system 10 may monitor wheel units on other types of vehicles in other applications.

The monitoring devices 20 may be of a type employing one or more application specific integrated circuits (ASIC's) and/or one or more sensor devices for measuring certain tire parameters, such as air pressure and/or temperature. In addition, the integrated circuit(s) may include programmable memory for storing vehicle specific, tire specific, cargo specific, and/or itinerary specific information. Data identifying the tire, the wheel unit, the vehicle, and the identity/source/destination of cargo carried by the transport vehicle may be stored as data within the monitoring devices 20 to be accessed as needed or desired.

The monitoring devices 20 may include an RF transmitter and logic for transmitting data relating to measured tire parameters and/or stored reference data to a remote receiver for analysis and display. The monitoring devices 20 may further include a receiver and logic for receipt of an initiation signal from a source external to the wheel units 12, 14. The transmission of data from the monitoring devices 20 to a remote receiver may be in response to receipt of the initiation signal. Thus, operationally, the data transmission circuitry of the monitoring devices 20 conveying tire/vehicle data to an external reader may be activated by the receipt of an externally originating initiation signal by a receiver within the monitoring devices 20.

One or more Low Frequency (LF) antennas may be positioned at locations suitable for operationally delivering an LF initiation signal to one or more wheel units 12, 14 of a vehicle as the vehicle drives through a service station 40. The LF antenna(s) may have a loop configuration, each formed by one or more LF antenna loop(s) 22. The LF antenna loops 22 may be embedded within a ground pad 46 located in the service station 40. Positioned adjacent to the ground pad 46 in operational proximity to the monitoring device 20 may be an RF receiver 28 with an RF antenna 30. The RF antenna 30 may receive data transmission from the one or more vehicle monitoring devices 20 mounted in the tires 16 of the wheel units 12, 14.

The vehicle may be repositioned sequentially within the service station 40 to allow each monitoring device 20 to be sequentially brought into initiation signal range of a single LF antenna, whereupon each device 20 may be activated and placed into a data transmitting mode for data transmission to the receiver 28. Alternatively, multiple receiver/antenna pairs 28 may be positioned within the service station 40, each assigned to receive data transmission from one or more respective monitoring devices 20 of the vehicle. Employment of multiple RF receiver/LF transmitter pairs within the station reduces the time required for the data transmission to be completed. Whether sequentially or simultaneously, each monitoring device 20 of the vehicle, in response to an LF initiation signal, may be activated to transmit RF encoded data to the receiver 28.

The LF loop antenna 22 may be electrically connected by conductor 24 to an LF transmitter 26. The RF receiver 28 may be coupled to the RF antenna 30 and may receive the RF transmission of data from one or more assigned monitoring devices 20. The RF receiver 28 may be coupled to an output device, such as a display screen 32, for visually conveying information to an operator. In addition, data from the RF receiver 28 may be transmitted, via connection 34, to a data processing system, such as the personal computer 36, for further processing and sharing of the data, along output lines 38, to locations.

The in-ground drive-by configuration and positioning of the LF antenna 22 shown in FIGS. 1 and 2 may be employed or alternative antenna configurations and locations may be used. Delivery of an initiation signal to the monitoring devices 20 may be effected by alternative LF antenna configurations and locations. For example, an alternative upright panel LF antenna configuration may be used.

As shown in FIGS. 3-9, a drill guide assembly 100 in accordance with the present invention includes a first slide rail 110, a second slide rail 120, a first engagement block 130, a second engagement block 140, and a drill mount 150. The drill mount 150 includes a toroidal base 152, a first upright guide member 154 secured to the toroidal base by a first fastener 155, a second upright guide member 156 secured to the toroidal base by a second fastener 157, and a slide member 158 for slidingly engaging the first and second guide members 154, 156. The slide member 158 has two outer cylindrical tubes for sliding along the guide members 154, 156 and a central cylindrical tube for slidingly engaging a drill such as a hand drill 101. The two outer cylindrical tubes of the slide member 150 further include set screws 159 for selectively securing the slide members against sliding relative to the guide members 154, 156 (i.e., vertically).

Figure 6:
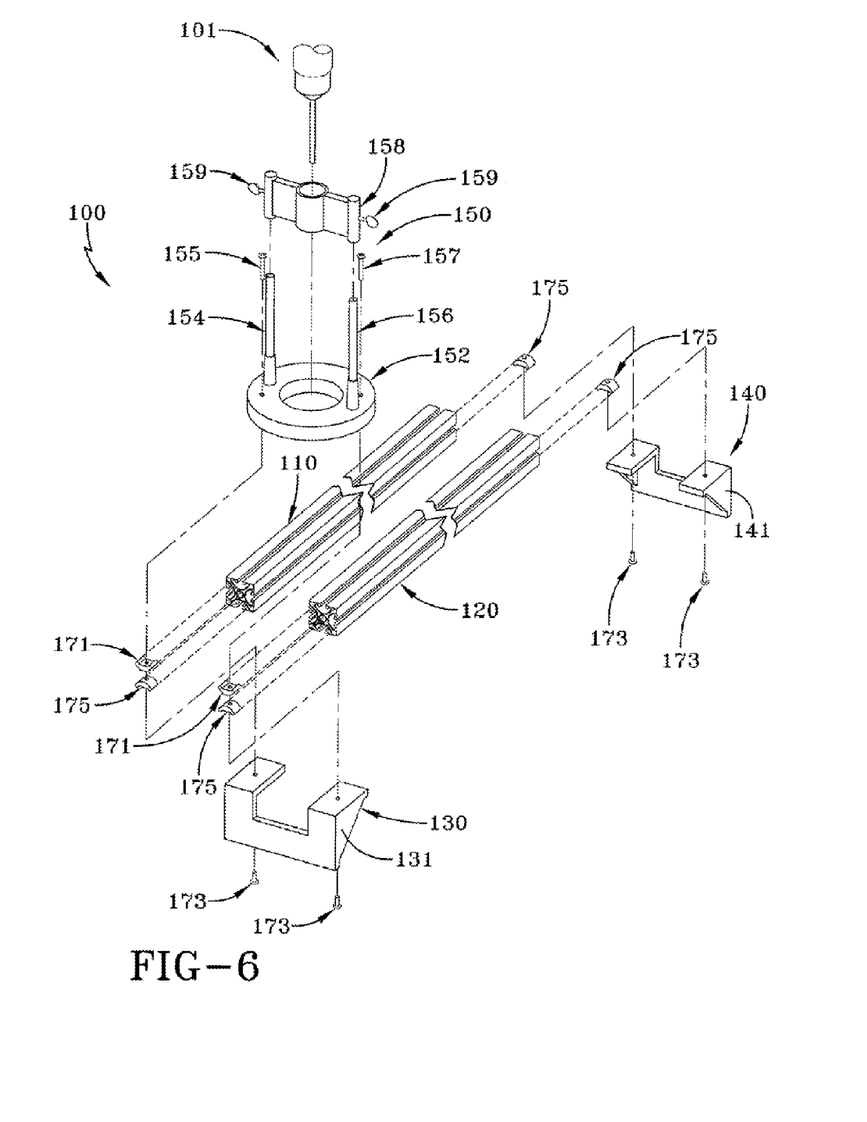
FIG. 6 is a schematic exploded perspective view of part of the assembly of FIG. 3.

As shown in FIG. 6, the slide member 150 is slidingly secured to the slide rails 110, 120 by the fasteners, such as bolts 155, 157 and corresponding threaded slide caps 171. When the fasteners 155, 157 and slide caps 171 are threadingly secured in a tightly fitted arrangement, the slide member 150 is fixed against movement relative to the slide rails 110, 120. When the fasteners 155, 157 and slide caps 171 are loosened, the slide member 150 may move along the slide rails 110, 120 (i.e., horizontally) to any desired position and subsequently tightened in that desired position relative to the slide rails.

The engagement blocks 130, 140 have angled portions 131, 141 for abutting diametrically opposed shoulder portions of a tire, such as the example tire 16. The engagement blocks 130, 140 are slidingly secured to the slide rails 110, 120 by fasteners, such as bolts 173, and corresponding threaded slide caps 175. When the fasteners 173 and slide caps 175 are threadingly secured in a tightly fitted arrangement, the engagement blocks 130, 140 are fixed against movement relative to the slide rails 110, 120. When the fasteners 173 and slide caps 175 are loosened, the engagement blocks 130, 140 may move along the slide rails 110, 120 (i.e., horizontally for varied tire sizes or diameters) to any desired position and subsequently tightened in that desired position relative to the slide rails.

Figure 7:
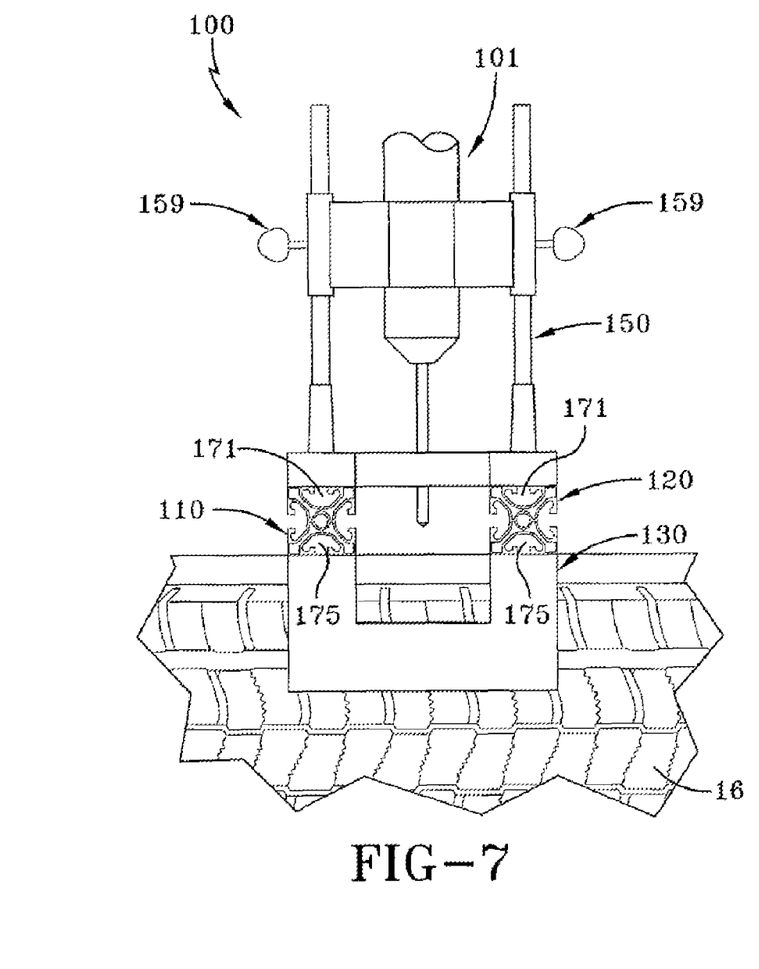
FIG. 7 is a schematic end view of the assembly of FIG. 3 under a first condition.
Figure 8:
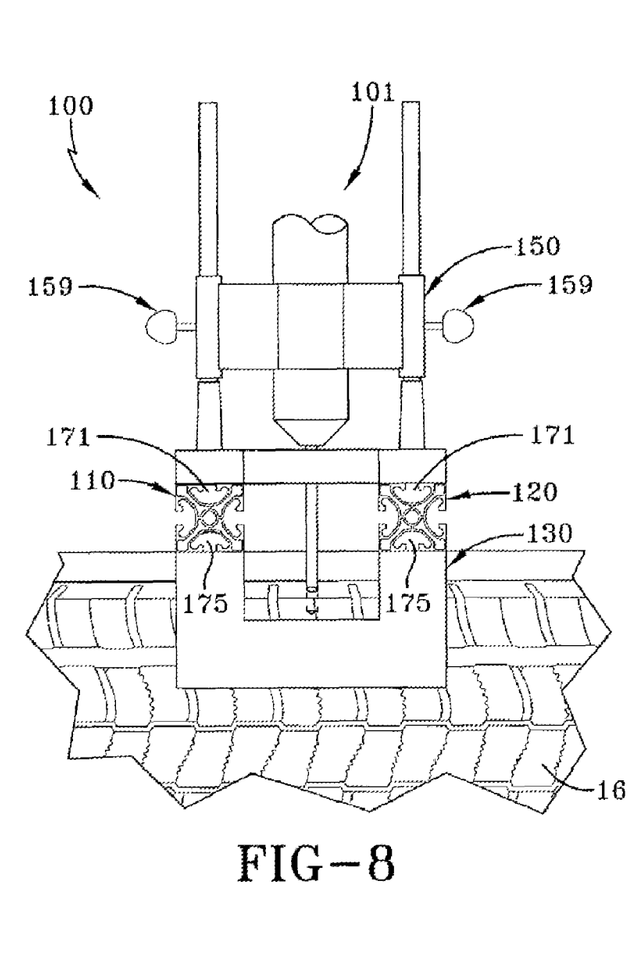
FIG. 8 is a schematic end view of the assembly of FIG. 3 under a second condition.

As shown in FIGS. 7 and 8, the drill guide assembly 100 provides a retracted position of the drill 101 (FIG. 7) and an extended position (FIG. 8) having a preset or predetermined limit in order to provide uniformity for the depth of the elongated bore in the tire 16. The drill guide assembly 100 thereby provides improved precision when drilling holes in tires. In order to insert a thermocouple (or other) wires into a tire 16, the assembly 100 provides a hole drilled at a specific location, angle, and depth. The assembly 100 employs a drill guide 150 modified to fit onto the two parallel slide rails 110, 120. The slide rails 110, 120 allow for the drill 101 to slide back and forth (radially with respect to the tire 16) to move the drill relative to the tire. The slide rails 110, 120 may further have a plate (not shown) on one end that is set against the tire 16 to help secure and locate the drill guide 150. The slide rails 110, 120 rest against the sidewall of a tire laying on its side to provide a vertically uniform starting position for the drill 101.

A set of thumb screws 159 may be used to secure the slide rail 158 once positioned in its intended location, thereby ensuring consistent drilling depth. Variation in an angle of the drilled hole is virtually eliminated.

Non-destructive analysis of instrumented tires using the drill guide assembly 100 has shown vast improvements in the precision and accuracy of thermocouple wire locations in a tire, such as the example tire 16. Precision holes for tire instrumentation, such as thermocouples, are required for accurate and consistent temperature measurements. The assembly 100 in accordance with the present invention improves the uniformity the location of thermocouples in a tire.

As stated above, the assembly 100 allows adjustment to fit many tire sizes as well as allowing for placement in varied locations on a tire (i.e., by rotating the assembly 100 itself around the axis of the tire and sliding the drill guide 150 along the slide rails 110, 120). A new assembly is thus not needed to accommodate a new tire. The assembly 100 accommodates many different sizes and types of tires and is virtually universal in its application.

Figure 5:
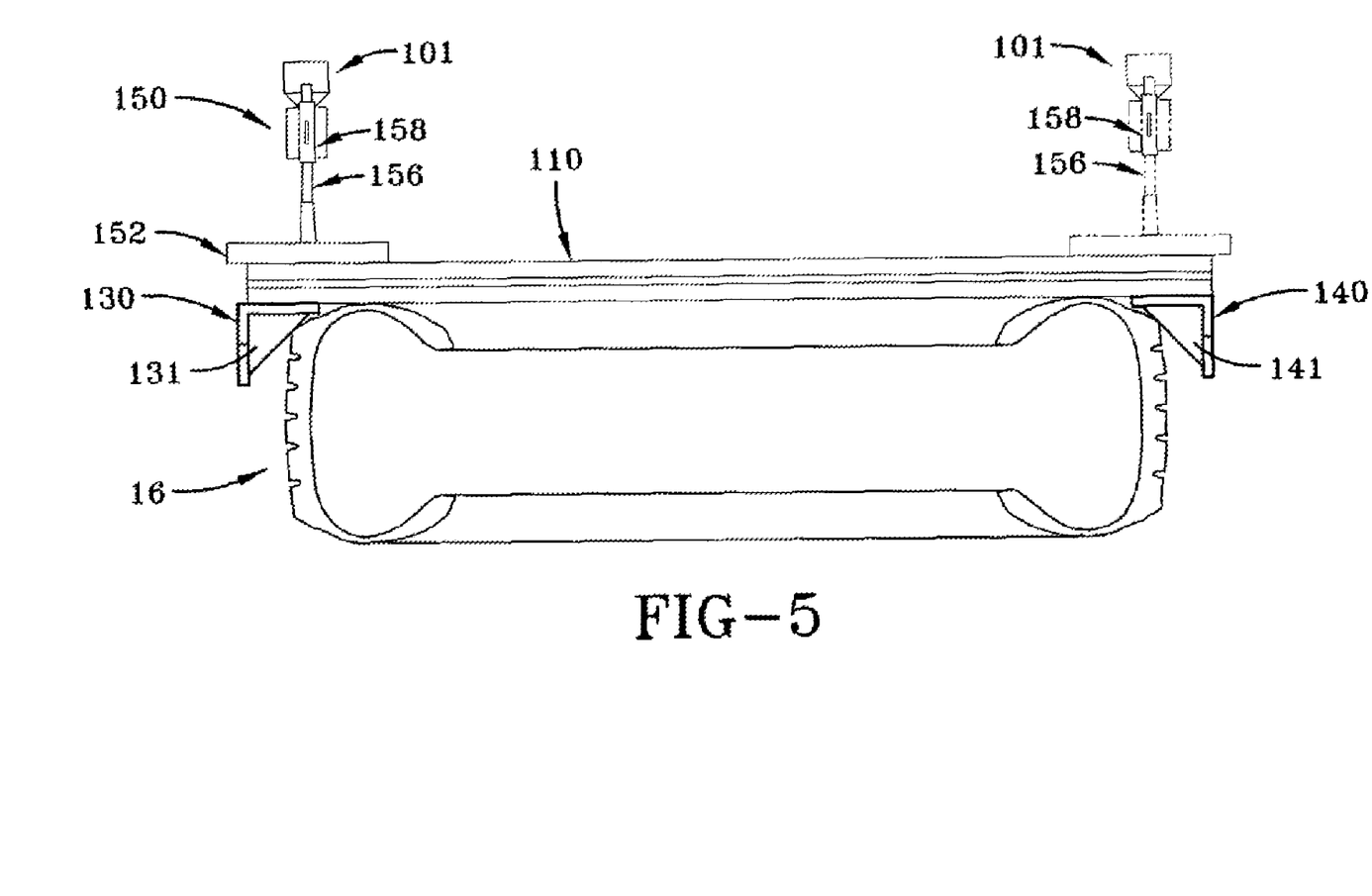
FIG. 5 is a schematic side view of the assembly of FIG. 3.
Figure 9:
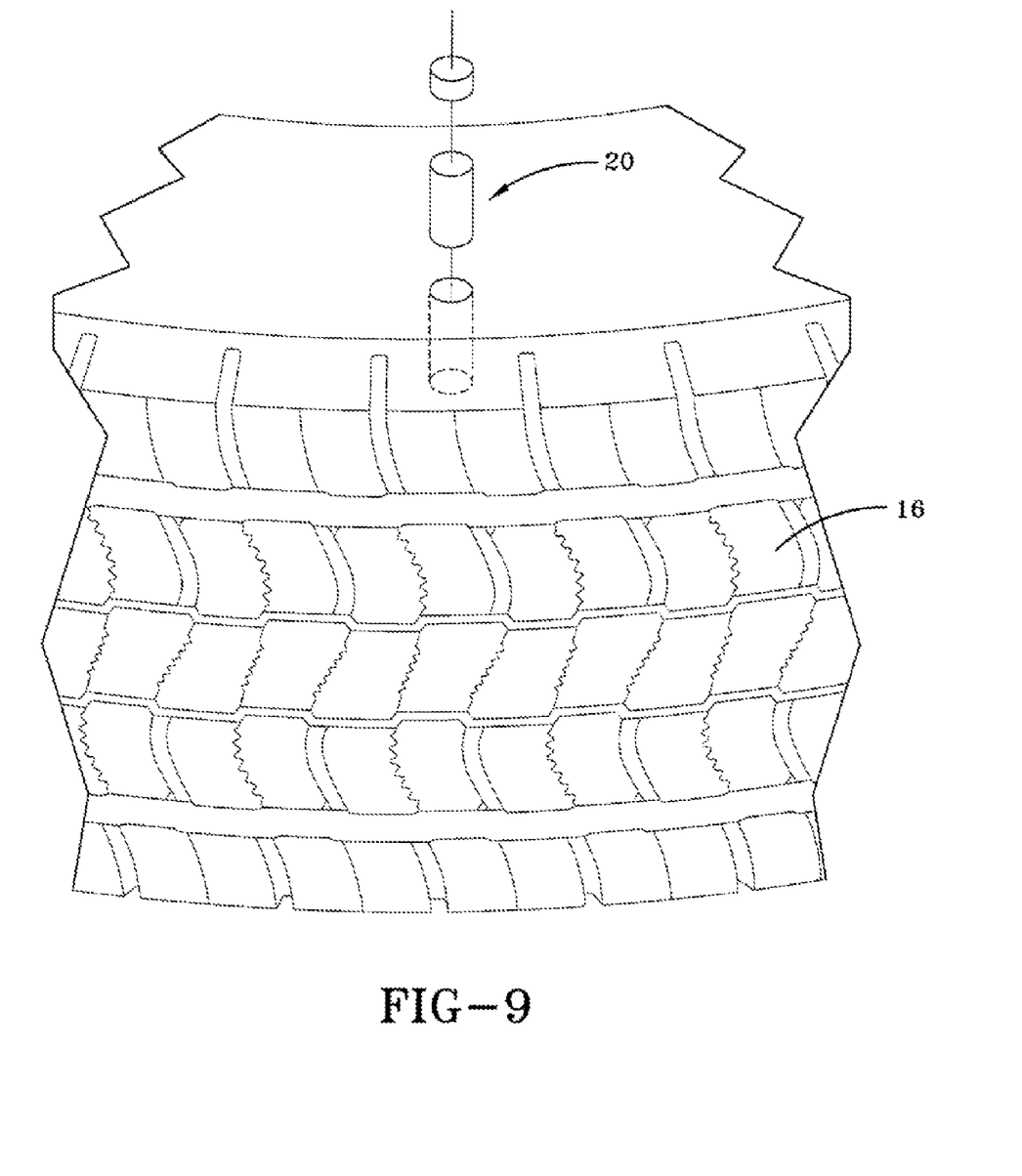
FIG. 9 is a schematic detail perspective view of part of the assembly of FIG. 3.

The assembly 100 further provides improved levels of precision and accuracy in drilling, virtually eliminating variations in drilling angle, depth, and location by merely laying the assembly on the side of the tire 16 (FIG. 5). The assembly 100 reduces speed of drilling and increases efficiency of a typically heretofore time-consuming process. Again, as stated above, non-destructive analysis has shown dramatic improvements in the precision and accuracy of the holes drilled by using the assembly in accordance with the present invention. As shown in FIG. 9, a thermocouple or other monitoring device 20 may be inserted in the already drilled elongate bore or hole and a cap of suitable tire material may be placed at the radially outer end portion of the bore to secure the thermocouple in the bore.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A drill guide assembly for providing a bore in a tire comprising:

a first slide rail for lying on the tire when the tire lies on a side;

a second slide rail for lying on the tire when the tire lies on a side, the second slide rail being disposed parallel to the first slide rail;

a first engagement block slidingly secured to the first slide rail and the second slide rail, the first engagement block engaging a first shoulder portion of a tread portion of the tire;

a second engagement block slidingly secured to the first slide rail and the second slide rail, the second engagement block engaging a second shoulder portion of the tread portion of the tire, the second shoulder portion being diametrically opposed to the first shoulder portion; and a drill mount for positioning a drill relative to the tire, the drill mount including a toroidal base, a first upright guide member secured to the toroidal base, a second upright guide member secured to the toroidal base, and a slide member for slidingly engaging the first and second guide members, the slide member having two outer cylindrical tubes for sliding along the first and second guide members and a central cylindrical tube for slidingly engaging a drill, the slide member of the drill mount being slidingly secured to the slide rails by bolts and corresponding threaded slide caps.

2. The drill guide assembly as set forth in claim 1 wherein the two outer cylindrical tubes of the slide member further include set screws for selectively securing the slide members against sliding relative to the first and second guide members.

3. The drill guide assembly as set forth in claim 1 wherein the bolts and corresponding slide caps are threadingly secured in a tightly fitted arrangement such that the slide member of the drill mount is fixed against movement relative to the slide rails.

4. The drill guide assembly as set forth in claim 3 wherein the bolts and corresponding slide caps may be loosened such that the slide member may is movable along the slide rails to a desired position and the bolts and corresponding slide caps subsequently may be tightened in that desired position relative to the slide rails.

5. The drill guide assembly as set forth in claim 1 wherein the engagement blocks have angled portions for abutting shoulder portions of the tire.

6. The drill guide assembly as set forth in claim 5 wherein the engagement blocks are slidingly secured to the slide rails by bolts and corresponding threaded slide caps.

7. The drill guide assembly as set forth in claim 6 wherein the bolts and slide caps are threadingly secured in a tightly fitted arrangement such that the engagement blocks are thereby fixed against movement relative to the slide rails.

8. The drill guide assembly as set forth in claim 7 wherein, when the bolts and slide caps are loosened, the engagement blocks may move along the slide rails for adjusting to varied tire sizes.

9. The drill guide assembly as set forth in claim 1 wherein the drill guide assembly provides a retracted position for the drill and an extended position for the drill, the extended position having a predetermined limit in order to provide uniformity for a depth of the bore.

\* \* \* \* \*